United States Patent
Kaneko

(10) Patent No.: US 10,309,702 B2
(45) Date of Patent: Jun. 4, 2019

(54) CONTROL VALVE

(71) Applicant: TGK CO., LTD., Tokyo (JP)

(72) Inventor: Takeshi Kaneko, Tokyo (JP)

(73) Assignee: TGK CO., LTD., Tokyo (JP)

( * ) Notice: Subject to any disclaimer, the term of this patent is extended or adjusted under 35 U.S.C. 154(b) by 944 days.

(21) Appl. No.: 14/845,196

(22) Filed: Sep. 3, 2015

(65) Prior Publication Data

US 2016/0097574 A1    Apr. 7, 2016

(30) Foreign Application Priority Data

Oct. 1, 2014    (JP) ................................ 2014-203378

(51) Int. Cl.
*F25B 41/06*    (2006.01)
*F16K 27/02*    (2006.01)
*F25B 49/02*    (2006.01)

(52) U.S. Cl.
CPC ............ *F25B 41/062* (2013.01); *F16K 27/02* (2013.01); *F25B 49/02* (2013.01); *F25B 2341/0683* (2013.01); *F25B 2500/13* (2013.01)

(58) Field of Classification Search
CPC  F25B 41/062; F25B 49/02; F25B 2341/0683; F25B 2500/13
See application file for complete search history.

(56) References Cited

U.S. PATENT DOCUMENTS

2005/0193562 A1*  9/2005  Andra ...................... B23C 3/05
                                                            29/890.122
2008/0251742 A1* 10/2008  Ise ......................... F25B 41/062
                                                                251/11

FOREIGN PATENT DOCUMENTS

| EP | 1 857 747 A1 | 11/2007 | ............. F25B 41/06 |
| EP | 2 667 118 A2 | 11/2013 | ............. F25B 41/06 |
| JP | 2001012824 A | 1/2001 | ............. F25B 41/06 |
| JP | 2013-242129 | 5/2013 | ............. F25B 41/06 |
| JP | 2013242129 A * | 5/2013 | |

OTHER PUBLICATIONS

Satake et al., Expansion Valve and Spring Vibration Isolator, May 12, 2013, JP2013242129A, Whole Document.*
EP15184493, European Search Report, dated Feb. 4, 2016, Munich.

* cited by examiner

*Primary Examiner* — Larry L Furdge
(74) *Attorney, Agent, or Firm* — Penilla IP, APC

(57) ABSTRACT

An expansion valve includes a shaft one end side of which connects to a power element and the other end side of which connects to a valve element, the shaft transmitting the drive force, generated by the power element in a direction of axis line, to the valve element, and a sliding mechanism that applies a sliding resistance to the actuation of the valve element. The sliding mechanism is configured such that the magnitude of the sliding resistance affected to the valve element is varied by the position of the valve element in the direction of axis line in the body.

16 Claims, 9 Drawing Sheets

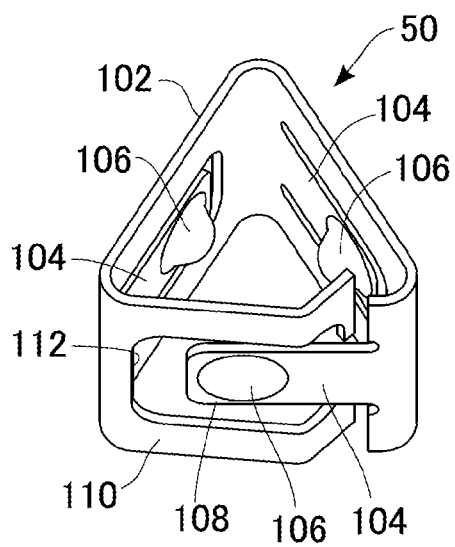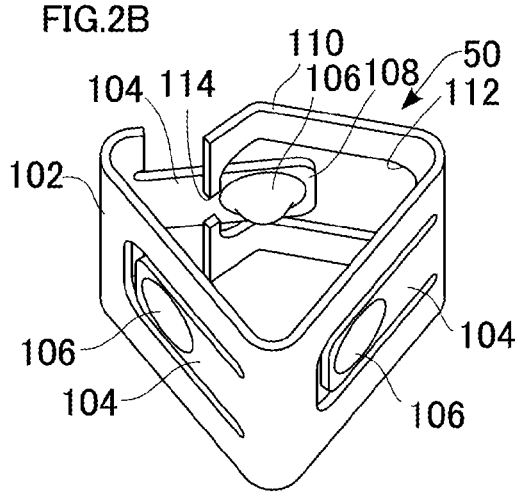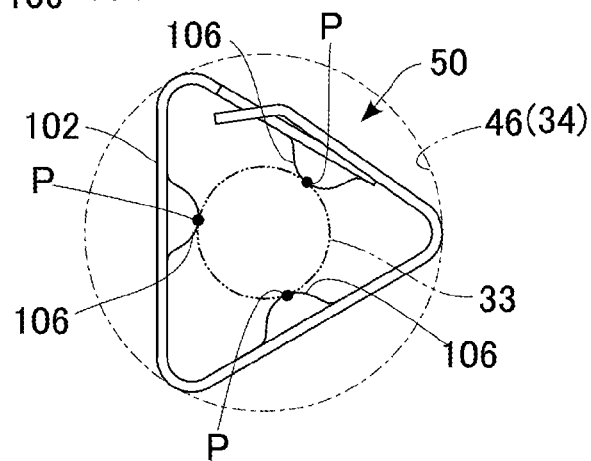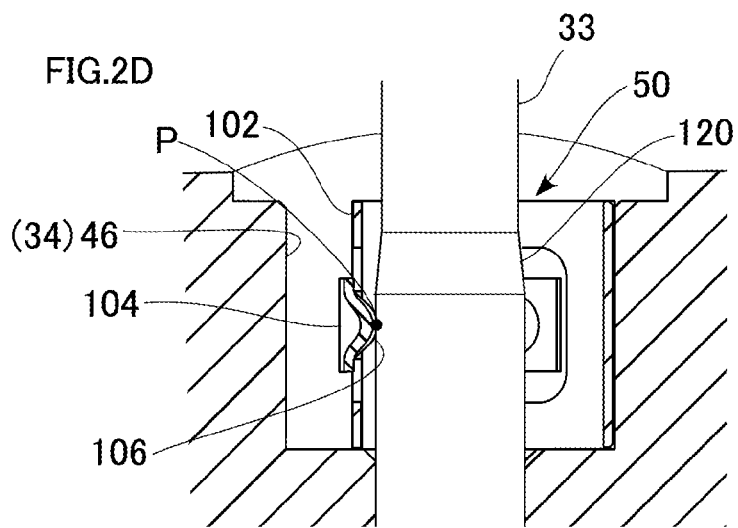

FIG.5A
FIG.5B
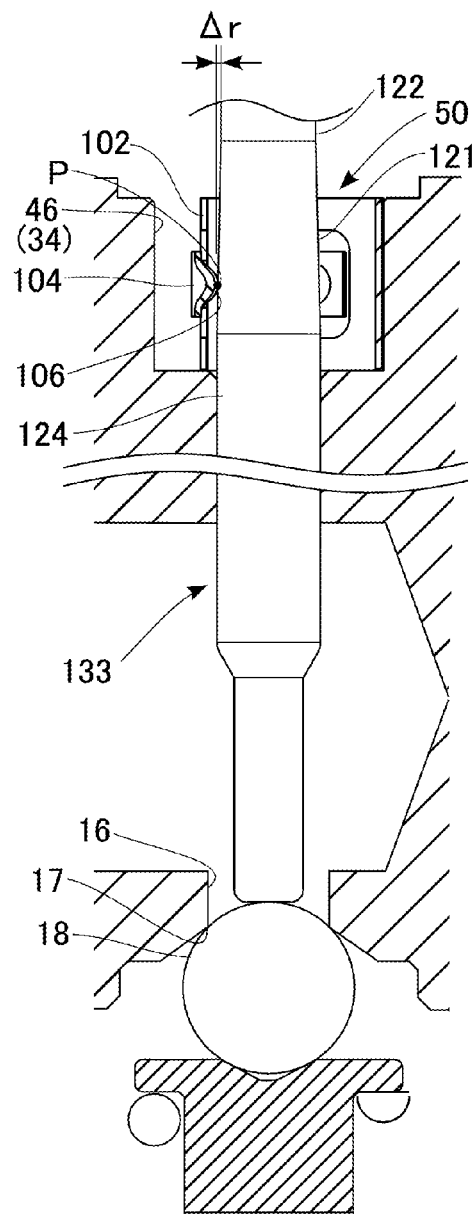
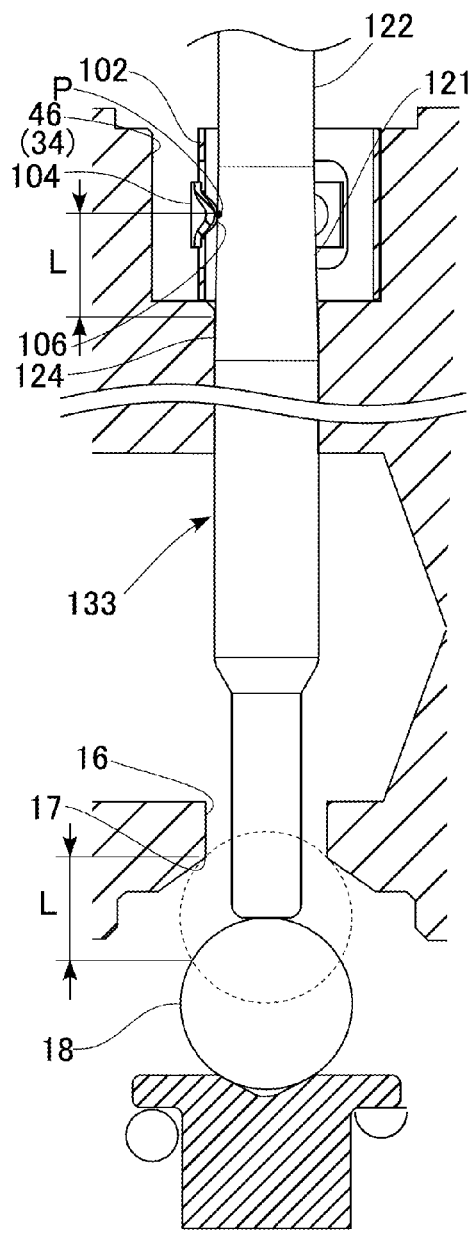

CONTROL VALVE

CLAIM OF PRIORITY

This application claims priority to Japanese Patent Application No. 2014-203378, filed Oct. 1, 2014, and is incorporated herein by reference.

BACKGROUND OF THE INVENTION

1. Field of the Invention

The present invention relates to a control valve and, more particularly to a structure of a vibration-proof spring suitable in preventing the vibration of an actuating section of the control valve.

2. Description of the Related Art

A refrigeration cycle in an automotive air conditioner is generally configured such that the refrigeration cycle includes a compressor, a condenser, a receiver, an expansion valve, and an evaporator. The compressor compresses a circulating refrigerant. The condenser condenses the compressed refrigerant. The receiver separates the condensed refrigerant into a gas and a liquid. The expansion valve throttles and expands the separated liquid refrigerant and delivers it by turning it into a spray. Then the evaporator evaporates the misty refrigerant and thereby cools the air inside a vehicle by the evaporative latent heat. Used as the expansion valve is a thermostatic expansion valve that senses the temperature and pressure of refrigerant at an outlet side of the evaporator such that, for example, the refrigerant led out from the evaporator has a predetermined degree of superheat and that controls the flow rate of refrigerant delivered to the evaporator by opening and closing a valve section.

This expansion valve includes a body formed with a first passage for passing the refrigerant flowing from the receiver to the evaporator and a second passage for passing the refrigerant returned from the evaporator and then supplying the refrigerant to the compressor. A valve hole is formed midway in the first passage. Provided is a valve element that closes and opens a valve section by touching and leaving the valve hole, respectively. The valve element, which moves toward and away from the valve hole, regulates the flow rate of refrigerant flowing toward the evaporator. Also provided is a power element that senses the temperature and pressure of refrigerant flowing through the second passage and controls the valve opening degree of the valve section. The drive force of the power element is transmitted to the valve element by way of an elongated shaft. One end side of the shaft is connected to the power element across the second passage. The other end thereof is connected to the valve element such that the shaft passes through an insertion hole formed in a partition wall provided between the first passage and the second passage.

In such an expansion valve, the pressure may fluctuate in an upstream side of the valve section where, for example, a high-temperature refrigerant is introduced. If this problem of fluctuation is left unattended, the valve element may vibrate and generate noise. The following method is available to alleviate this problem. That is, a mounting hole formed coaxially with the insertion hole is formed in the partition wall and then a cylindrically-shaped vibration-proof spring is provided in the mounting hole; this vibration-proof spring biases the shaft radially inward thereof so as to develop a sliding resistance (friction) and, as a result, the valve element does not respond sensitively to the fluctuation in pressure (see Reference (1) in the following Related Art List, for instance).

RELATED ART LIST (1) Japanese Unexamined Patent Application Publication No. 2013-242129.

In such an expansion valve, the sliding resistance of the shaft needs to be increased for the purpose of enhancing the suppression effect of vibration sound. However, an increased sliding resistance may increase the hysteresis during an opening/closing actuation of the valve element and thereby deteriorate the actuation responsiveness thereof; this may possibly cause a control hunting. For these reasons, the sliding resistance is set such that either one of vibration sound and the control hunting is preferentially suppressed or such that both of them are compromised to a certain degree.

SUMMARY OF THE INVENTION

The present invention has been made in view of the foregoing problems, and a purpose thereof is to provide a control valve capable of effectively suppressing both the vibration sound during the actuation of a valve element and the control hunting.

One embodiment of the present invention relates to a control valve, provided in a refrigeration cycle, for controlling a flow of refrigerant. The control valve includes: a body having a lead-in port through which the refrigerant is led in, a lead-out port through which the refrigerant is led out, and a valve hole formed in a refrigerant passage joining the lead-in port to the lead-out port; a valve element that opens and closes a valve section by moving toward and away from the valve hole; a drive section that generates drive force used to open and close the valve section; a shaft one end side of which connects to a movable member of the drive section and the other end side of which connects to the valve element, the shaft transmitting the drive force, generated by the drive section in a direction of axis line, to the valve element, wherein the shaft is so provided as to run through an insertion hole formed in the body; and a sliding mechanism that directly or indirectly applies a sliding resistance to an actuation of the valve element. The sliding mechanism is configured such that a magnitude of the sliding resistance affected to the valve element is varied by a position of the valve element in the direction of axis line in the body.

By employing this embodiment, the magnitude of the sliding resistance affected to the valve element is varied by the position of the valve element in the direction of axis line. Specifically, the sliding resistance can be varied according to the opening degree of the valve element. This enables the sliding resistance to be relatively small in a valve opening degree region, where it is desired that the actuation responsiveness of the valve element be enhanced and the control hunting be suppressed, and also enables the sliding resistance to be relatively large in a valve opening degree region, where the vibration sound tends to be larger. As a result, a control valve capable of effectively suppressing both the vibration sound during the actuation of the valve element and the control hunting can be provided.

BRIEF DESCRIPTION OF THE DRAWINGS

FIGS. 2A to 2D each shows a structure of a vibration-proof spring and a mounting structure thereof;

FIGS. 5A and 5B are each a partial cross-sectional view showing a structure and a function of a sliding mechanism according to a modification;

DETAILED DESCRIPTION OF THE INVENTION

Figure 1:
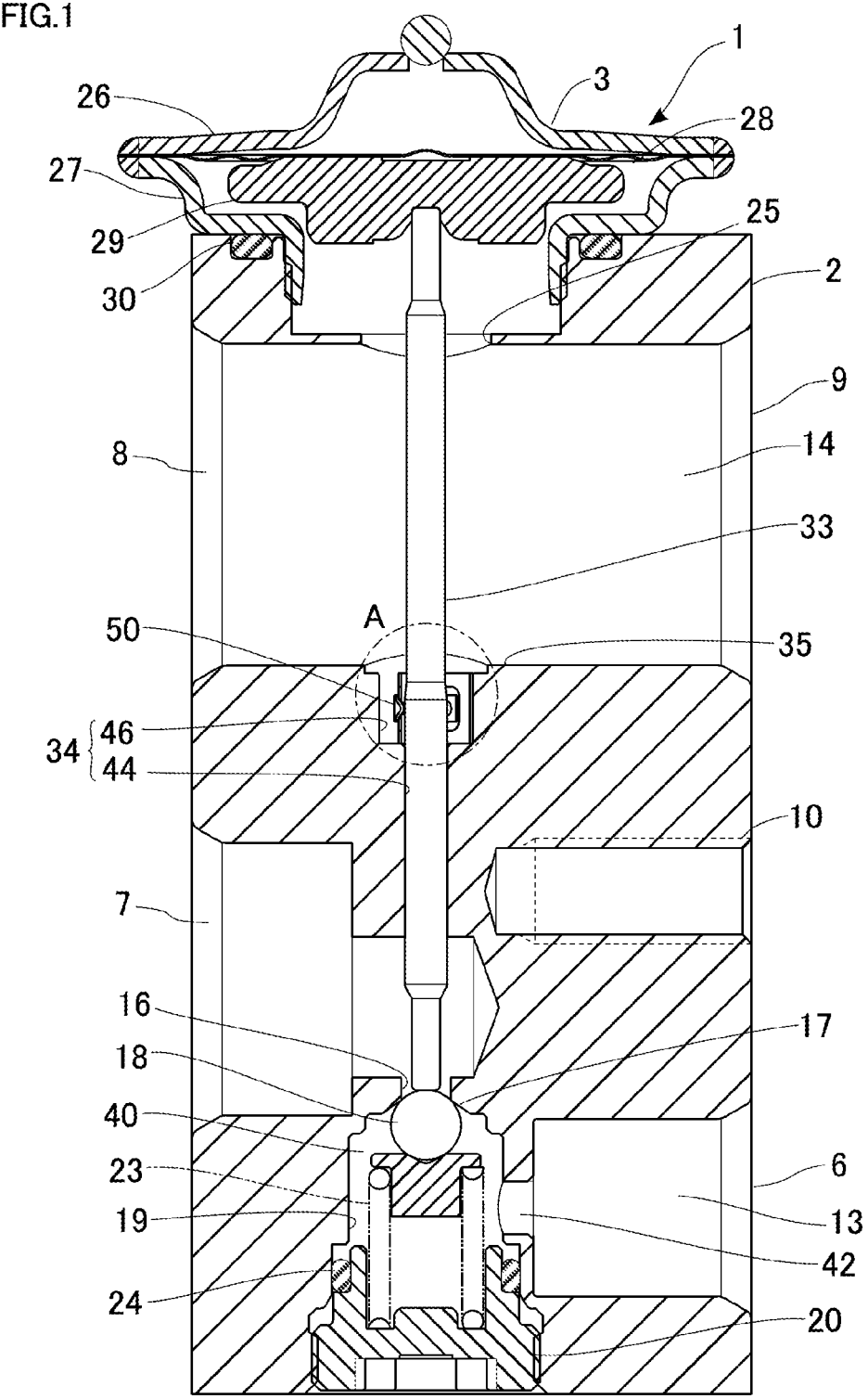
FIG. 1 is a cross-sectional view of an expansion valve according to a first embodiment.

The invention will now be described in detail based on preferred embodiments with reference to the accompanying drawings. This does not intend to limit the scope of the present invention, but to exemplify the invention.

In the following description, for convenience of description, the positional relationship in each structure may be expressed according to how each component is depicted in Figures. Note that the almost identical components are given the identical reference numerals in the following embodiments and their modifications and that the repeated description thereof will be omitted as appropriate.

The invention will now be described by reference to the preferred embodiments. This does not intend to limit the scope of the present invention, but to exemplify the invention.

First Embodiment

The present embodiment is a constructive reduction to practice of the present invention where an expansion valve according to the preferred embodiments is used as a thermostatic expansion valve applied to a refrigeration cycle of an automotive air conditioner. The refrigeration cycle in the automotive air conditioner is configured by including a compressor, a condenser, a receiver, an expansion valve, and an evaporator. Here, the compressor compresses a circulating refrigerant. The condenser condenses the compressed refrigerant. The receiver separates the condensed refrigerant into a gas and a liquid. The expansion valve throttles and expands the separated liquid refrigerant and delivers it by turning it into a spray. The evaporator evaporates the misty refrigerant and thereby cools the air inside a vehicle's passenger compartment by the evaporative latent heat. A detailed description of each component except for the expansion valve in this refrigeration cycle is omitted in the following.

FIG. 1 is a cross-sectional view of an expansion valve according to a first embodiment of the present invention.

An expansion valve 1 has a body 2. This body 2 is formed such that a member, which is obtained by extrusion-molding a raw material made of an aluminum alloy, is subjected to a predetermined cutting work. This body 2, which is prismatic in shape, is provided with a valve section. This valve section, which throttles and expands the refrigerant, is provided inside the body 2. A power element 3, which functions as a temperature-sensing section, is provided at a longitudinal end of the body 2.

The body 2 has a lead-in port 6, a lead-out port 7, a lead-in port 8, and a lead-out port 9 on sides thereof. The lead-in port 6 receives a high-temperature and high-pressure liquid refrigerant from a receiver side (condenser side). Through the lead-out port 7, a low-temperature and low-pressure refrigerant, which is throttled and expanded by the expansion valve 1, is supplied to the evaporator. The lead-in port 8 receives the refrigerant evaporated by the evaporator. Through the lead-out port 9, the refrigerant, which has passed through the expansion valve 1, returns to the compressor side. A screw hole 10, through which a not-shown stud bolt used to mount the piping can be studded, is formed between the lead-in port 6 and the lead-out port 9. A piping joint is connected to each port.

In the expansion valve 1, a first passage 13 is configured by the lead-in port 6, the lead-out port 7, and a refrigerant passage connecting these ports. A valve section is provided in a middle part of the first passage 13. The refrigerant introduced from the lead-in port 6 is throttled and expanded through this valve section and then turned into a spray so as to be supplied to the evaporator through the lead-out port 7. Also, a second passage 14, which corresponds to "return passage", is configured by the lead-in port 8, the lead-out port 9, and a refrigerant passage connecting these ports. The second passage 14 extends straight, and the refrigerant is led in through the lead-in port 8 and then delivered to the compressor through the lead-out port 9.

A valve hole 16 is provided in a middle part of the first passage 13 in the body 2, and a valve seat 17 is formed by an opening end edge on a lead-in port 6 side of the valve hole 16. A valve element 18 is so placed as to face the valve seat 17 from a lead-in port 6 side. The valve element 18 is constructed such that a spherical ball valve element, which closes and opens the valve section by touching and leaving the valve seat 17, respectively, is joined to a valve element support that supports the ball valve element from below.

In a lower end part of the body 2, a communication hole 19, which communicates to and from the body 2, is formed in a direction perpendicular to the first passage 13, and a valve chamber 40, which contains the valve element 18, is formed by an upper half of the communication hole 19. The valve chamber 40 communicates with the valve hole 16 at an upper end of the valve chamber 40, and the valve chamber 40 communicates with the lead-in port 6 on a lateral side of the valve chamber 40 through a small hole 42. Thereby, the valve chamber 40 constitutes a part of the first passage 13. The small hole 42 is formed such that the cross section of part of the first passage 13 is locally narrowed, and the small hole 42 is open into the valve chamber 40.

In a lower half of the communication hole 19, an adjustment screw 20 (which corresponds to an "adjustment member") is screwed in such a manner as to seal the communication hole 19 from the outside. A spring 23, which biases the valve element 18 in a valve closing direction, is set between the valve element 18 (more precisely, the valve element support) and the adjustment screw 20. The spring load of the spring 23 can be adjusted by a screwing amount of the adjustment screw 20 into the body 2. An O-ring 24, which is used to prevent the leakage of refrigerant, is set between the adjustment screw 20 and the body 2.

In an upper end part of the body 2, a communication hole 25, which communicates to and from the body 2, is formed in a direction perpendicular to the second passage 14, and the power element 3 (which corresponds to "temperature-sensing section") is screwed in such a manner as to seal off the communication hole 25. The power element 3 is configured such that a diaphragm 28 formed of a sheet metal is held between an upper housing 26 and a lower housing 27 and such that a disk 29 is disposed on a lower housing 27 side. A gas used to sense the temperature is filled in a hermetically sealed space enclosed by the upper housing 26 and the diaphragm 28. An O-ring 30, which is used to prevent the leakage of refrigerant, is set between the power element 3 and the body 2. The pressure and temperature of refrigerant passing through the second passage 14 are transmitted to an undersurface of the diaphragm 28 by way of the communication hole 25 and grooves provided in the disk 29.

In a central part of the body 2, a stepped hole 34 (functioning as an "insertion hole") is so provided as to run through a partition wall 35 provided between the first passage 13 and the second passage 14, and an elongated shaft 33 is slidably inserted into a smaller-diameter part 44 of the stepped hole 34. The shaft 33, which is a rod formed of a metal (e.g., stainless steel) is set between the disk 29 and the valve element 18. With this structure and arrangement, a drive force generated by a displacement of the diaphragm 28 is transmitted to the valve element 18 by way of the disk 29 and the shaft 33 so as to open and close the valve section.

An upper half of the shaft 33 moves across the second passage 14, whereas a lower half thereof slidably penetrates the smaller-diameter part 44 of the stepped hole 34. A vibration-proof spring 50 is contained in a larger-diameter part 46 (functioning as a "mounting hole") of the stepped hole 34. Here, the vibration-proof spring 50 is used to exert a biasing force, whose direction is vertical to a direction of axis line, on the shaft 33; in other words, the vibration-proof spring 50 is used to exert a lateral load (sliding load) on the shaft 33. As the shaft 33 receives the lateral load of the vibration-proof spring 50, the vibration of the shaft 33 and the valve element 18 caused by a change in the refrigerant pressure is suppressed or inhibited.

In the expansion valve 1 as configured above, the power element 3 senses the pressure and the temperature of the refrigerant that has been brought back from the evaporator via the lead-in port 8 and thereby the diaphragm 28 develops a displacement. The displacement developed by the diaphragm 28 becomes the drive force and is then transmitted to the valve element 18 via the disk 29 and the shaft 33, thereby opening and closing the valve section. Also, the liquid refrigerant supplied from the receiver is introduced from the lead-in port 6 and then passes through the valve section. Having thus passing through the valve section throttles and expands the liquid refrigerant, and thereby turns it into a low-temperature and low-pressure misty refrigerant. This misty refrigerant is delivered toward the evaporator from the lead-out port 7.

A description is now given of a structure of the vibration-proof spring 50 and a mounting structure thereof. FIGS. 2A to 2D each shows a structure of a vibration-proof spring 50 and a mounting structure thereof. FIG. 2A is a perspective view of the vibration-proof spring 50 viewed from a front side. FIG. 2B is a perspective view of the vibration-proof spring 50 viewed from a back side. FIG. 2C is a plain view showing a state where the vibration-proof spring 50 is inserted to the larger-diameter part 46. FIG. 2D is an enlarged view of a region A encircled in FIG. 1.

As shown in FIGS. 2A to 2C, the vibration-proof spring 50 has a spring body 102, of a triangular tube (cylindrical) shape in cross section, with flat side walls, and spring parts 104 integrally formed with their respective side walls. Note hereinafter that the spring body 102 is simply referred to as a "body 102" also. One of the three spring parts 104 is constituted by a portion that extends at one end of the body 102. Each of the two remaining spring parts 104 is constructed by a residue part obtained after each side wall of the body 102 has been punched into a U-shape profile. Each spring part 104 is constructed such that a base end section of the spring part 104 is supported by the body 102 in a cantilevered manner and such that a tip of the spring part 104 extends circumferentially along most of the side wall of the body 102. In a tip of the spring part 54, a semispherical bulging portion 106 (which corresponds to a "contact portion") is formed inwardly of the body 102 in a protruding manner.

The vibration-proof spring 50 is formed such that a band-like plate is bent and processed at a plurality of positions along an extending direction. Thus there is a slit in a side wall where both ends of a single plate bent are disposed opposite to each other. In other words, one of the spring parts 104 forms one end 108 of the body 102, and said one end 108 thereof has a projected shape. An opening 112 having an approximately rectangular shape is formed at the other end 110 of the body 102, and a tip of the other end 110 is bent inward. The one end 108 is inserted to the opening 112 with the bent portion of the other end 110 as an inlet port and thereby the ends 110 and 108 overlap with each other.

As shown in FIG. 2B, a tip of the other end 110 is partially open and the other end 110 has a slit 114. However, the width of this slit 114 is set to a value equal to or less than the width of the spring part 104, which is one end 108 of the body 102. Thus, when the one end 108 and the other end 110 are fit to each other with no load applied to the vibration-proof spring 50, the slit 114 is substantially closed. This structure makes it more difficult to other members be caught in a gap between the both ends 108 and 110 of the body 102. In other words, it is assumed herein that in the distribution processes, instead of a single unit of vibration-proof spring 50, a plurality of vibration-proof springs 50 are packed in one box, for instance. This helps a plurality of vibration-proof springs 50 easily handled in packing them so that the plurality of vibration-proof springs 50 are not entangled with each other in such a situation.

In a forming process of the vibration-proof spring 50, a not-shown metallic plate is first punched into a plate-like body having a band-like shape through a press-forming. This metallic plate is formed of a highly elastic non-magnetic material, which is, for example, a non-magnetic metal such as stainless steel. More specifically, the metallic plate is subjected to the press-forming using a predetermined metal mold so as to form a spring part 104 into the projected and recessed shapes at both ends of the metallic plate and, at the same time, two spring parts 104 are formed in positions corresponding to the respective side walls of the body 102. At this time, the bulging portion 106 is formed on each spring part 104 by the press-forming. In this manner, the thus obtained plate-like body is bent at a plurality of positions along the extending direction thereof. As a result, the vibration-proof spring 50 comprised of the cylindrical body having a triangular shape in cross section is obtained. In other words, performing a so-called forming processing on the plate-like body and bending this plate-like body between the adjacent spring parts 104 form the triangular cylindrical body.

In an unloaded state where the vibration-proof spring 50 is not yet inserted to the larger-diameter part 46 (insertion hole), a corner of the body 102 where the both ends of the body 102 are located is placed slightly outwardly, so that the vibration-proof spring 50 is a non-equilateral triangle in shape. When the vibration-proof spring 50 is inserted into the stepped hole 34, a load is applied such that the both ends thereof come closer to each other and then the vibration-proof spring 50 is inserted thereinto when the shape of the vibration-proof spring 50 in cross section is close to an equilateral triangle. The vibration-proof spring 50 is inserted into the stepped hole 34 while it is elastically deformed from the unloaded state. Thus, as shown in FIG. 2C, the vibration-proof spring 50 is secured to the larger-diameter part 46 by an elastically reactive force produced when the load is released.

When, on the other hand, the vibration-proof spring 50 is inserted to the larger-diameter part 46, the three spring parts 104 produce a lateral load (a radially inward load) toward the shaft 33. That is, as the shaft 33 is inserted to the vibration-proof spring 50, as shown in FIGS. 2C and 2D, while the vibration-proof spring 50 is inserted to the larger-diameter part 46, the three spring parts 104 are bent or warped outwardly up to the positions where the three spring parts 104 are almost coplanar with the side walls of the body 102; as a result, an elastically reactive force of the spring parts 104 creates an appropriate sliding force (friction) on the shaft 33. Inserting the shaft 33 in this manner makes the spring parts 104 bent or warped radially outward. If, in this case, the spring parts 104 are plastic-deformed to a certain degree, the pressing force of the spring parts 104 to the shaft 33 (i.e., the sliding force in between the bulging portions 106 and the shaft 33) can be stabilized. In other words, the spring part 104 may be used in an elastic region or in a plastic region.

Note that if the vibration-proof spring 50 is inserted to the larger-diameter part 46 as shown in FIG. 2C, the three bulging portions 106 will touch the shaft 33 at contact points P, namely the three bulging portions 106 will be in point-contact with the shaft 33 at the contact points P. This structure constantly ensures the point-contact state of the bulging portions 106 and the shaft 33 even though the shaft 33 is slightly tilted, for instance. Hence, the smooth support condition by the vibration-proof spring can be maintained.

At the same time, as shown in FIG. 2D, provision of a tapered portion 120 midway in the direction of axis line of the shaft 33 allows the sliding force, which is applied to the shaft 33 according to a valve-opening stroke, to be varied. The "valve-opening stroke" as meant here indicates an uplift amount (displacement) of the valve element 18 from the valve seat 17. Specifically, the structure of the shaft 33, including the tapered portion 120, and the vibration-proof spring 50 function as a "sliding mechanism" where the magnitude of the sliding resistance applied to the actuation of the valve element 18 is varied by the position of the valve element 18 in the body 2 in the direction of axis line. The tapered portion 120 has a tapered surface where the outside diameter thereof is smaller upward (namely, as it gets far away from the valve element 18).

Figure 3A:
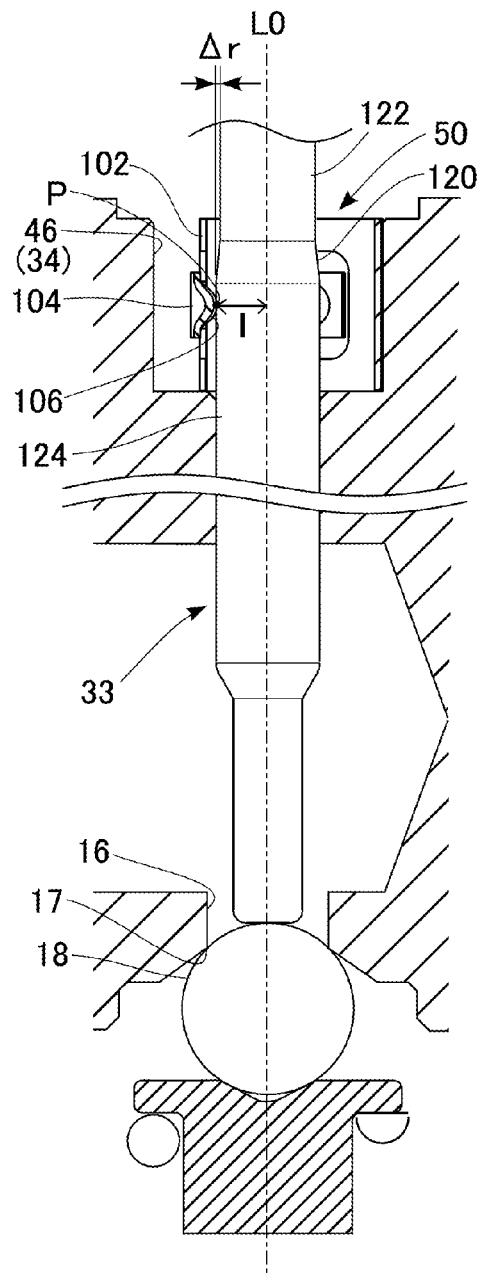
FIGS. 3A and 3B are each a partial cross-sectional view showing a structure and a function of a sliding mechanism.
Figure 3B:
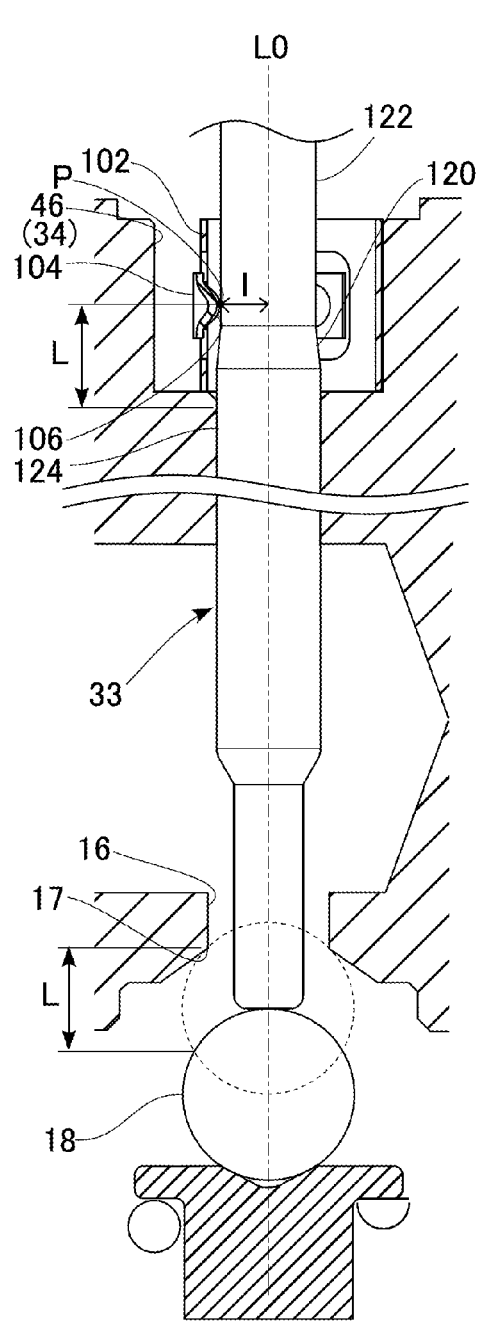

FIGS. 3A and 3B are each a partial cross-sectional view showing a structure and a function of the sliding mechanism. FIG. 3A shows a state where the valve element 18 is in a valve-closed position or in a position close thereto (a slightly open position). FIG. 3B shows a state where the valve element 18 is in a fully open position or in a position close thereto.

As shown in FIG. 3A, the shaft 33 has a smaller-diameter part 122 in an upper part thereof and a larger-diameter part 124 in a lower part thereof with the tapered portion 120 positioned between the smaller-diameter part 122 and the larger-diameter part 124. The smaller-diameter part 122 is smaller in radius by $\Delta r$ than the larger-diameter part 124. In other words, the tapered portion 120 is formed to have a slope such that the difference in height of the tapered surface is $\Delta r$. When, as shown in FIG. 3A, the valve section is in a valve-closed state or a slightly open state, the bulging portions 106 abut against the larger-diameter part 124. As a result, the sliding resistance produced by the vibration-proof spring 50 (a frictional force resulting from the reactive force of the spring parts 104) becomes relatively large.

When, as shown in FIG. 3B, the valve section is in the fully open state or in a state close thereto, the bulging portions 106 abut against the smaller-diameter part 122. As a result, the sliding resistance produced by the vibration-proof spring 50 becomes relatively small. When the valve section is in a half open state, the bulging portions 106 abut against the tapered portion 120. As a result, the sliding resistance continuously varies according the position of the valve element 18 in the direction of axis line. The shaft 33 is displaced in the direction of axis line within the same range as the valve-opening stroke L of the valve element 18. In this stroke range of the shaft 33, the spring parts 104 abut against any one of the smaller-diameter part 122, the tapered portion 120 and the larger-diameter part 124.

With this structure and arrangement, a contact point P of the vibration-proof spring 50 and the shaft 33 and a distance l between the vibration-proof spring 50 and an axis line L0 of the shaft 33 vary according to the position of the valve element 18 in the direction of axis line. This varies the elastic force of the spring parts 104 and subsequently varies the magnitude of the sliding resistance applied to the actuation of the valve element 18. In the example of FIGS. 3A and 3B, the magnitude of the sliding resistance applied to the actuation of the valve element 18 varies gradually or in stages, depending on whether the contact point P lies in the larger-diameter part 124 or the smaller-diameter part 122 (namely, according to the position of the valve element 18 in the direction of axis line).

Figure 4:
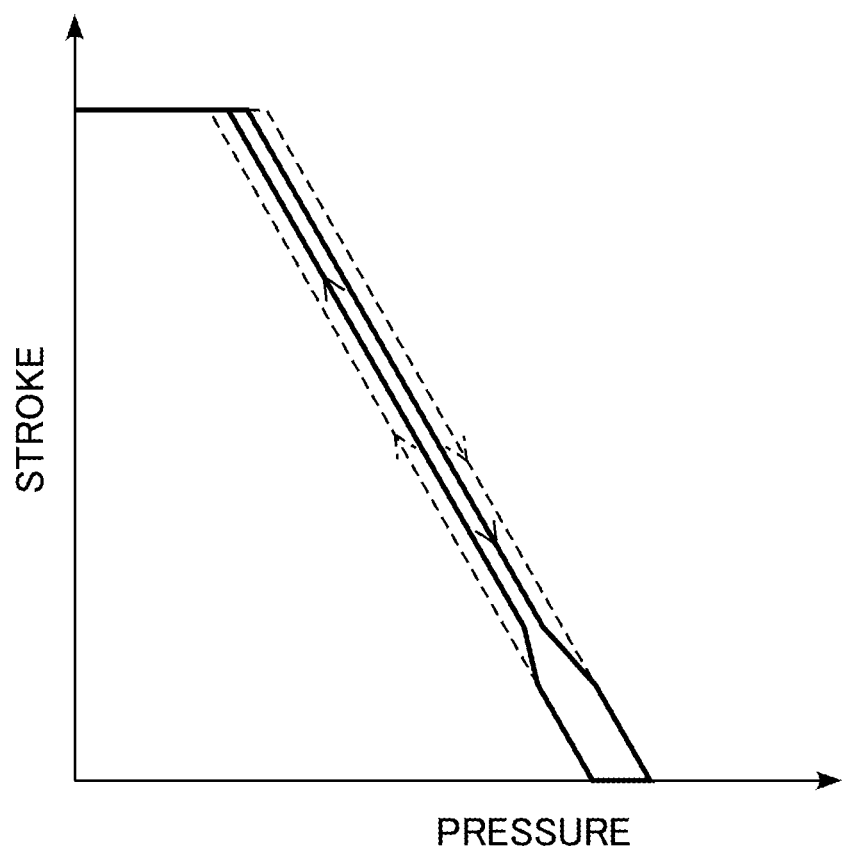
FIG. 4 is a graph showing hysteresis, occurring during an actuation of a valve element, caused by a sliding mechanism.

FIG. 4 is a graph showing hysteresis, occurring during an actuation of the valve element 18, caused by the sliding mechanism. The horizontal axis of FIG. 4 indicates a pressure sensed by the power element 3 (the pressure acting on the undersurface of the diaphragm 28), and the vertical axis indicates the valve-opening stroke. The solid line in FIG. 4 indicates a working process of the valve element 18 according to the present embodiment where the sliding resistance is varied, and the broken line indicates a working process of a valve element according to a comparative example where the sliding resistance is kept constant.

As shown in FIG. 4, according to the present embodiment, the hysteresis is relatively small in a region where the valve-opening stroke is sufficiently large, namely in the region where the valve opening degree is large; the hysteresis is relatively large in a region where the valve-opening stroke is small, namely in the region where the valve opening degree is small. In the present embodiment, the maximum stroke of the valve element 18 is 0.7 mm, and the setting is done as follows. That is, the setting is done such that the hysteresis is large when the valve-opening stroke is less than or equal to 0.1 mm (namely 17% of the maximum stroke) and such that it is small when the valve-opening stroke exceeds 0.1 mm. In the comparative example, the hysteresis is almost constant regardless of the valve-opening stroke. In contrast thereto, in the present embodiment, the hysteresis varies according to the valve-opening stroke.

By employing the present embodiment, the sliding resistance is made relatively small in a region where the pressure sensed by the power element 3 is small and the valve opening degree is large. This can enhance the actuation responsiveness of the valve element 18 and can suppress the control hunting. Specifically, the valve opening degree can be controlled without substantially causing a delay in response to the fluctuation of the superheating degree at an outlet side of the evaporator. Also, the sliding resistance is made relatively large in the region where the pressure sensed thereby is large and the valve opening degree is small. As a result, the actuation responsiveness of the valve element 18 can be reduced and the vibration sound can be suppressed.

(Modifications)

Figure 6A:
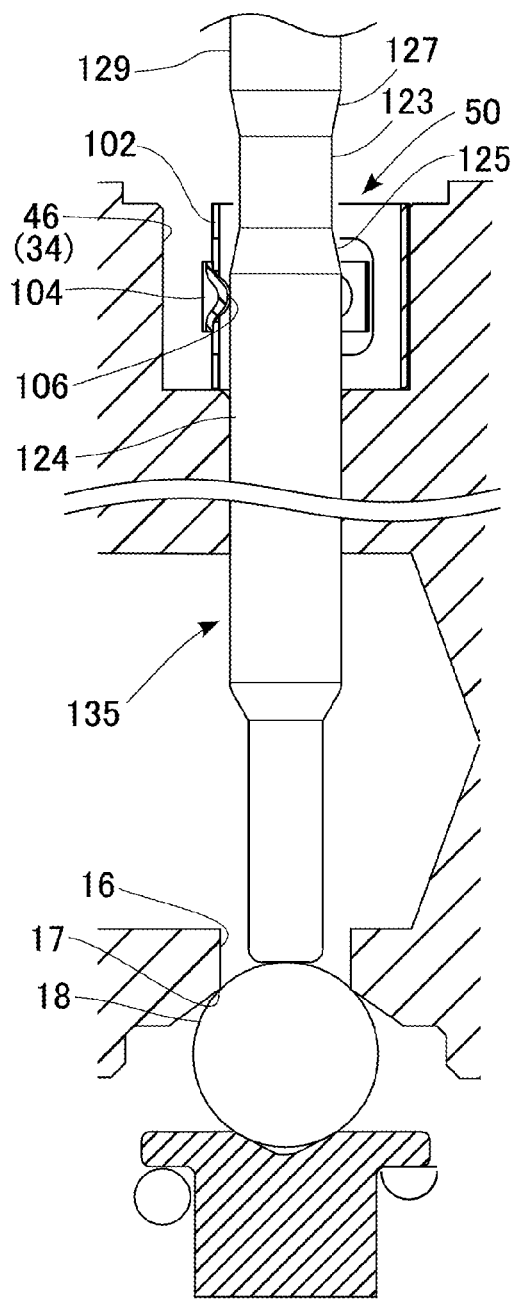
FIGS. 6A and 6B are each a partial cross-sectional view showing a structure and a function of a sliding mechanism according to a modification.
Figure 6B:
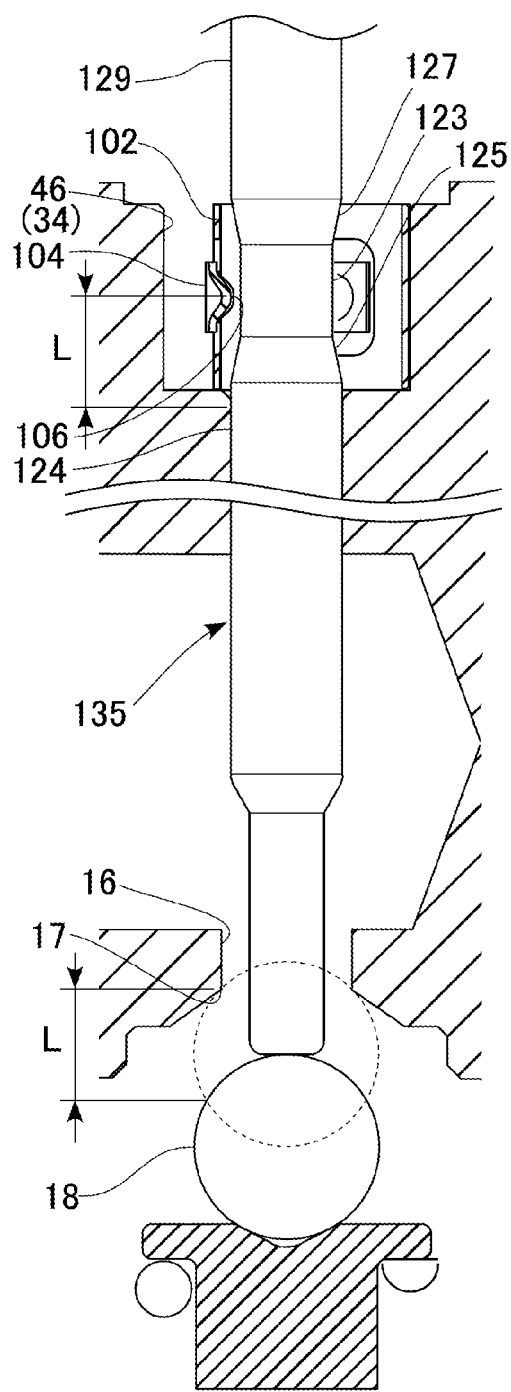

FIGS. 5A and 5B and FIGS. 6A and 6B are each a partial cross-sectional view showing a structure and a function of a sliding mechanism according to a modification. Each of FIG. 5A and FIG. 6A shows a state where the valve element 18 is in the valve-closed position or in a position close thereto (a slightly open position). Each of FIG. 5B and FIG. 6B shows a state where the valve element 18 is in the fully open position or in a position close thereto.

In the modification shown in FIGS. 5A and 5B, a shaft 133 has a tapered portion 121, which is longer than the tapered portion 120 of the first embodiment in the direction of axis line. Thus, the bulging portions 106 of the vibration-proof spring 50 abut against the shaft 133 within the range of the tapered portion 121. With this structure and arrangement, as shown in FIG. 5A, as the valve section approaches the valve-closed state, the bulging portions 106 abut against a relatively larger-diameter part of the tapered portion 121. As a result, the sliding resistance produced by the vibration-proof spring 50 (a frictional force resulting from the reactive force of the spring parts 104) becomes relatively large. On the other hand, as shown in FIG. 5B, as the valve section approaches the fully open state, the bulging portions 106 abut against a relatively smaller-diameter part of the tapered portion 121. As a result, the sliding resistance produced by the vibration-proof spring 50 becomes relatively small. The magnitude of the sliding resistance affected (applied) to the valve element 18 varies continuously, depending on where the contact point P lies in the tapered portion 121 (namely, according to the position of the valve element 18 in the direction of axis line). The present modification can also achieve similar operations and advantageous effects to those by the first embodiment.

In the modification shown in FIGS. 6A and 6B, the diameter of an intermediate portion of a shaft 135 is partially reduced, so that the intermediate portion thereof is formed as a smaller-diameter part 123. The smaller-diameter part 123 connects to the larger-diameter part 124 in a lower part of the shaft 135 by way of a tapered portion 125, and connects to a larger-diameter part 129 in an upper part thereof by way of a tapered portion 127. The tapered portion 125 has a tapered surface where the outside diameter thereof is smaller upward. On the other hand, the tapered portion 127 has a tapered surface where the outside diameter thereof is smaller downward. Although, in the present modification, the outside diameters of the larger-diameter parts 124 and 129 are equal to each other, these outside diameters thereof may be made to differ from each other.

When, as shown in FIG. 6A, the valve section is in the valve-closed state or a slightly open state, the bulging portions 106 abut against the larger-diameter part 124. As a result, the sliding resistance produced by the vibration-proof spring 50 is applied to the shaft 135. When, as shown in FIG. 6B, the valve section is in the fully open state or in a state close thereto, the bulging portions 106 face the smaller-diameter part 123 but does not abut against it. As a result, the sliding resistance by the vibration-proof spring 50 is zero.

When the valve section is in a half open state, there is a region where the bulging portions 106 abut against the tapered portion 125. As a result, the sliding resistance varies according the position of the valve element 18 in the direction of axis line. While the vibration sound can be suppressed by ensuring to apply the sliding resistance to a region where the valve opening degree is small, the present modification can apply no sliding resistance to a region where the valve opening degree is large and can therefore significantly enhance the actuation responsiveness of the valve element 18.

Second Embodiment

Figure 7:
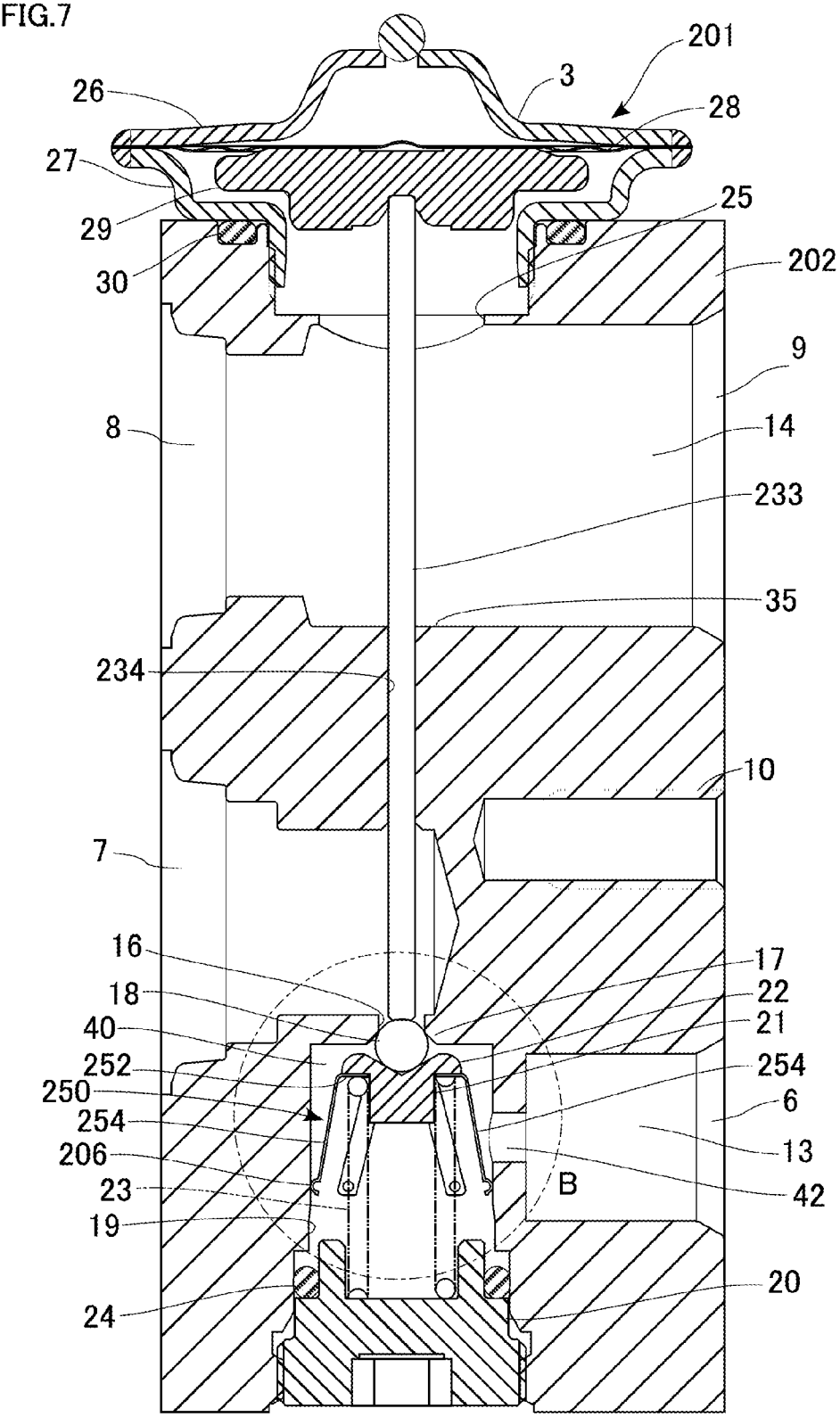
FIG. 7 is a cross-sectional view of an expansion valve according to a second embodiment.
Figure 8A:
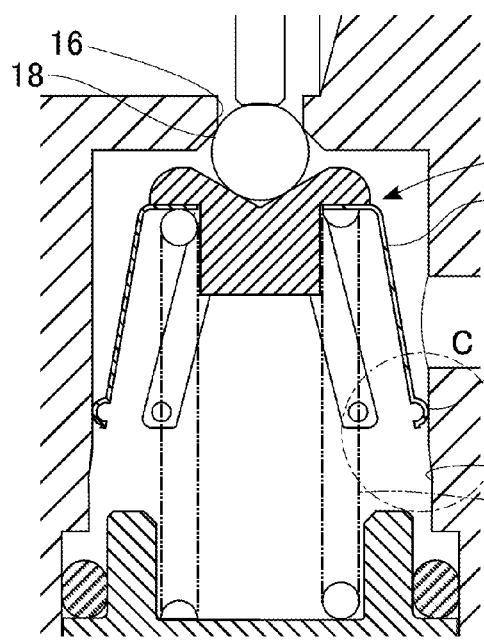
FIGS. 8A to 8D are each an enlarged view of a region B encircled in FIG. 17.
Figure 8B:
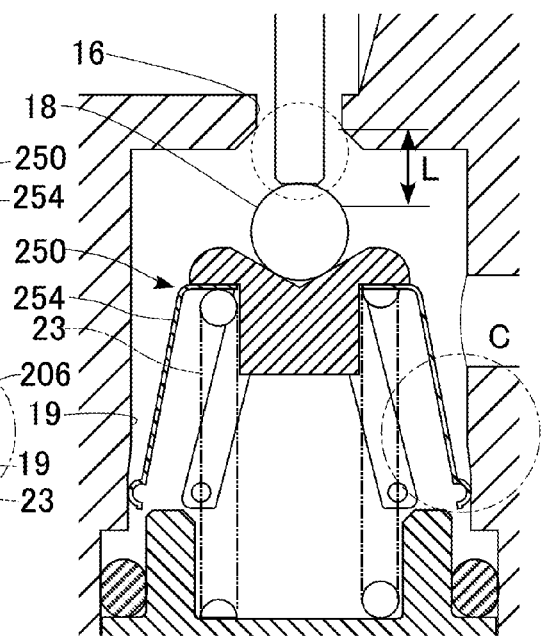
Figure 8C:
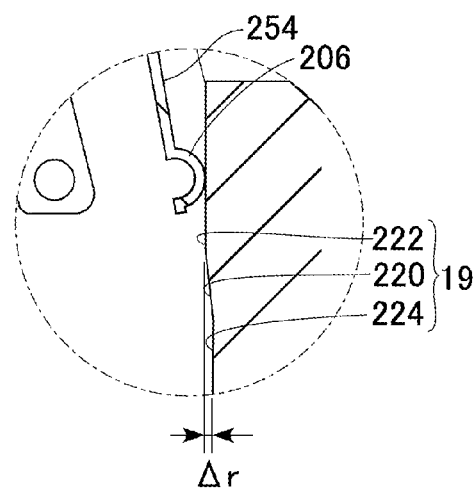
Figure 8D:
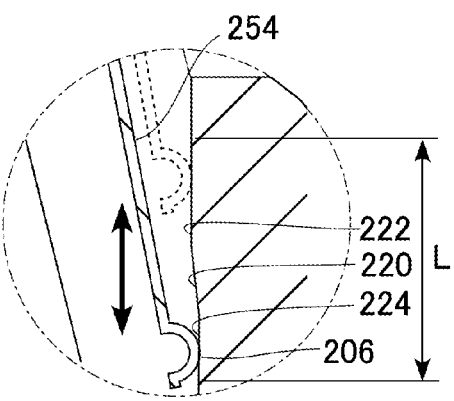

An expansion valve according to a second embodiment differs from the first embodiment in the structure of the sliding mechanism. FIG. 7 is a cross-sectional view of the expansion valve according to the second embodiment. FIGS. 8A to 8D are each an enlarged view of a region B encircled in FIG. 7. FIG. 8A shows a state where a valve element is in the valve-closed position or in a position close thereto (a slightly open position). FIG. 8B shows a state where the valve element is in the fully open position or in a position close thereto. FIG. 8C is an enlarged view of a region C encircled in FIG. 8A, and FIG. 8D is an enlarged view of a region C encircled in FIG. 8B.

As shown in FIG. 7, in an expansion valve 201, an insertion hole 234 is so formed as to run through a partition wall 35 in a body 202, and a shaft 233 is inserted into the insertion hole 234. The shaft 233 is cylindrical in shape across the entire length thereof with a constant cross section, and is slidably supported along the axis line of the body 202.

In a valve chamber 40, a vibration-proof spring 250 is provided integrally with a valve element 18. The vibration-proof spring 250 is obtained by press-forming a metallic plate, and has an annular base portion 252 and a plurality of spring parts 254 provided at regular intervals around the base portion 252. Although a total of eight spring parts 254 are provided in the present embodiment, the number of them may be set as appropriate according to the sliding force required, for instance.

The base portion 252 is inserted to a valve element support 21 of the valve element 18 from below and is stopped by a flange portion 22 provided in an upper part of the valve element support 21. The base portion 252 is fixed relative to the valve element 18 in a manner such that the base portion 252 is held by and between the flange portion 22 and a spring 23. In a modification, the base portion 252 may be secured to the flange portion 22 by means of welding or bonding, for instance.

The spring part 254 extends in an obliquely downward direction (a radially outward direction), and a semispherical bulging portion 206 (which corresponds to the "contact portion") protruding outward (radially outward) is provided in a tip of the spring part 254. The bulging portion 206 abuts against an inner wall of a communication hole 19 by an elastic force of the spring part 254. As a result, an appropriate sliding resistance can be obtained for the actuation of the valve element 18 by a frictional force between the inner wall thereof and the bulging portion 206.

As shown in FIGS. 8A and 8C, the communication hole 19 functions as a sliding area of the bulging portions 206, and has a smaller-diameter part 222, a tapered portion 220 and a larger-diameter part 224, from top to bottom along the communication hole 19. The smaller-diameter part 222 is smaller in radius by Δr than the larger-diameter part 224. In other words, the tapered portion 220 is formed to have a slope such that the difference in height of the tapered surface is Δr. When, as shown in FIGS. 8A and 8C, the valve section is in the valve-closed state or a slightly open state, the bulging portions 206 abut against the smaller-diameter part 222. As a result, the sliding resistance produced by the vibration-proof spring 250 (a frictional force resulting from the reactive force of the spring parts 254) becomes relatively large.

When, as shown in FIGS. 8B and 8D, the valve section is in the fully open state or in a state close thereto, the bulging portions 206 abut against the larger-diameter part 224. As a result, the sliding resistance produced by the vibration-proof spring 250 becomes relatively small. When the valve section is in a half open state, the bulging portions 206 abut against the tapered portion 220. As a result, the sliding resistance varies according the position of the valve element 18 in the direction of axis line. The vibration-proof spring 250 is displaced in the direction of axis line within the same range as the valve-opening stroke L of the valve element 18. In this stroke range of the vibration-proof spring 250, the spring parts 254 abut against any one of the smaller-diameter part 222, the tapered portion 220 and the larger-diameter part 224.

With this structure and arrangement, similar to the first embodiment, the second embodiment also enables the sliding resistance to be relatively small in a region, where the valve opening degree is large, and thereby the actuation responsiveness of the valve element 18 is enhanced, so that the control hunting can be suppressed. Also, the sliding resistance is made relatively large in a region, where the valve opening degree is small, and thereby the actuation responsiveness of the valve element 18 is reduced, so that the vibration sound can be suppressed.

(Modifications)

Figure 9A:
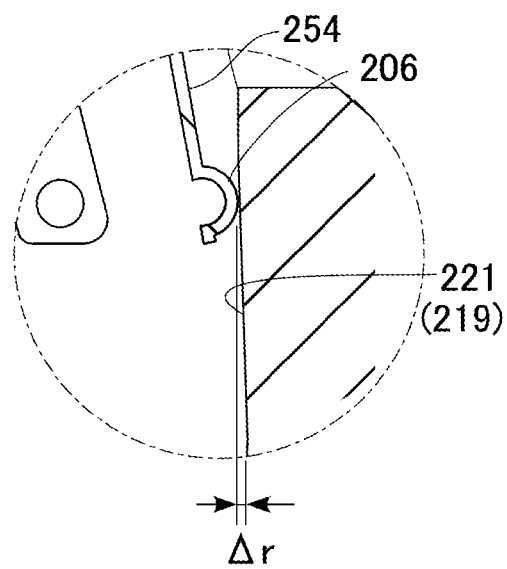
FIGS. 9A and 9B are each a partial cross-sectional view showing a structure and a function of a sliding mechanism according to a modification.
Figure 9B:
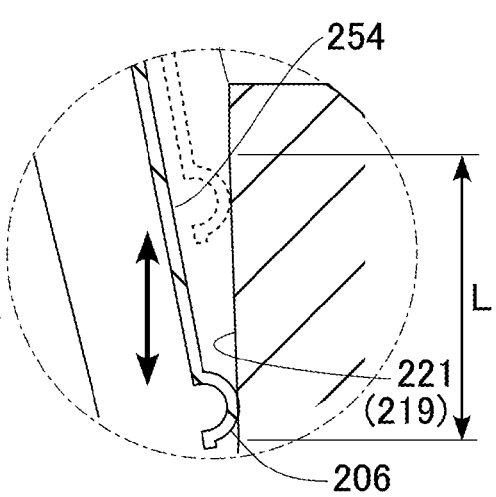

FIGS. 9A and 9B are each a partial cross-sectional view showing a structure and a function of a sliding mechanism according to a modification. FIG. 9A shows a state where the valve element 18 is in the valve-closed position or in a position close thereto (a slightly open position). FIG. 9B shows a state where the valve element 18 is in the fully open position or in a position close thereto.

In this modification, a communication hole 219 has a tapered portion 221, which is longer than the tapered portion 220 of the second embodiment in the direction of axis line. Thus, the bulging portions 206 of the vibration-proof spring 250 abut against the an inner wall surface of the communication hole 219 within the range of the tapered portion 221. With this structure and arrangement, as shown in FIG. 9A, as the valve section approaches the valve-closed state, the bulging portions 206 abut against a relatively small-diameter part of the tapered portion 221. As a result, the sliding resistance produced by the vibration-proof spring 250 (a frictional force resulting from the reactive force of the spring parts 254) becomes relatively large. On the other hand, as shown in FIG. 9B, as the valve section approaches the fully open state, the bulging portions 206 abut against a relatively larger-diameter part of the tapered portion 221. As a result, the sliding resistance produced by the vibration-proof spring 250 becomes relatively small. The present modification can also achieve similar operations and advantageous effects to those by the second embodiment.

In another modification, the structure may be such that the bulging portions 206 do not slide on the communication hole 219 in a lower part of the stroke range of the vibration-proof spring 250. That is, when the valve section is in the valve-closed state or a slightly open state, the bulging portions 206 abut against the communication hole 219, thereby applying the sliding resistance; when the valve section is in the fully open state or in a state close thereto, the bulging portions 206 may not abut against the communication hole 219 and therefore the sliding resistance may be zero. With this structure and arrangement, while the vibration sound can be suppressed by ensuring to apply the sliding resistance to a region where the valve opening degree is small, the present modification can apply no sliding resistance to a region where the valve opening degree is large and can therefore significantly enhance the actuation responsiveness of the valve element 18.

The description of the present invention given above is based upon illustrative embodiments. These embodiments are intended to be illustrative only and it will be obvious to those skilled in the art that various modifications could be further developed within the technical idea underlying the present invention.

In the above-described first embodiment, the vibration-proof spring 50 is so configured as to be of a triangular tube (cylindrical) shape but may be so configured as to be of any other polygonal shape or circularly cylindrical shape, instead.

In the above-described embodiment, as shown in FIG. 2C, the example is shown where when the shaft 33 is inserted while the vibration-proof spring 50 is inserted to the larger-diameter part 46, the three spring parts 104 are almost coplanar with their side walls. In a modification, the configuration may be such that when such a shaft 33 is inserted, the three spring parts 104 are warped outwardly of the side walls. Since the body 102 is of a polygonal shape, the spring part 104 can be warped using a gap formed between the side wall of the body 102 and the larger-diameter part 46.

Also, the configuration may be such that when no load is applied to the vibration-proof spring 50, the spring part 104 is positioned along the side wall of the body 102. Also, when the vibration-proof spring 50 is inserted to the larger-diameter part 46 and when the shaft 33 is inserted to this vibration-proof spring 50, the spring part 104 may be warped outwardly of the body 102. Alternatively, the configuration may be such that when the shaft 33 is inserted thereto like this, three spring parts 104 are positioned inwardly of the side walls. The three spring parts 104 are so configured as to be positioned coplanar with the side walls of the body 102 or warped outwardly of the side walls thereof when the shaft 33 is inserted like this; with this configuration, it is advantageous in that the body 102 can be constructed in a smaller size.

In the above-described first embodiment, a semispherical shape is described as the shape of the bulging portion 106 but a shape or form other than the semispherical one, such as an arch-like shape, may be selected, as appropriate, so long as such a shape or form, which protrudes inwardly, can apply an appropriate sliding load on the shaft 33. Also, in the above-described embodiment, the example is described where the body 102 of the vibration-proof spring 50 is of a triangular shape in cross section. Instead, the shape or form thereof may be a rectangular or square shape or any other polygonal shape in cross section.

The expansion valve according to the above-described embodiment is suitably applied to and used for a refrigeration cycle where hydrochlorofluorocarbon (HFC-134a) and so forth is used as the refrigerant. Also, the expansion valves according to the present embodiment and its modifications may be applied to a refrigeration cycle where a refrigerant, such as carbon dioxide, whose working pressure is high is used. In such a case, an external heat-exchanger such as a gas cooler may be placed in the refrigerant cycle, instead of the condenser. In this case, disk springs each formed of a metal, for example, may be disposed in superposition for the purpose of reinforcing the diaphragm constituting the power element 3. Alternatively, the disk springs or the like may be provided in place of the diaphragm.

In the above-described embodiment, the example is shown where the sliding mechanism of the vibration-proof spring is applied to an expansion valve. In a modification, the sliding mechanism thereof according to the embodiment and its modifications may be applied to a control valve installed in a variable displacement compressor. This valve varies the discharging capacity of the variable displacement compressor for compressing the refrigerant led into a suction chamber and then discharging the compressed refrigerant from a discharge chamber, by regulating the flow rate of the refrigerant led into a crankcase from the discharge chamber.

This control valve includes: a body having a discharge chamber communication port communicating with the discharge chamber, a crankcase communication port communicating with the crankcase, and a valve hole formed in a passage connecting the discharge chamber communication port and the crankcase communication port; a valve element for opening and closing a valve section, the valve element being arranged in such a manner as to be able to move toward and away from the valve hole; a solenoid that generates force with which to drive the valve element in a valve closing direction, the solenoid being such that an electric conduction state is controlled by a PWM (Pulse Width Modulation) technique; a shaft for transmitting the force generated by the solenoid to the valve element; and a vibration-proof spring that applies the sliding resistance to the shaft by biasing the shaft in a radially inward direction in such a manner as to hold the shaft in a hollow center of the spring.

The shaft is so provided as to pass through the insertion hole formed in the body. One end side of the shaft connects to a plunger (movable member) of a solenoid, whereas the other end side thereof connects the valve element. The shaft transmits the drive force, generated by the solenoid, in the direction of axis line to the valve element. The vibration-proof spring is contained in the body and in the mounting hole formed coaxially with the insertion hole, and applies the sliding resistance to the shaft by coaxially inserting the shaft and biasing the shaft in a radially inward direction. The mounting hole may be provided in a core of the solenoid. The vibration-proof spring may be configured according the above-described embodiment or the modifications.

In the above-described first embodiment, the example has been shown where the vibration-proof spring is employed as a sliding member constituting the sliding mechanism and is abutted against the shaft and thereby the sliding resistance is applied to the actuation of the valve element. In a modification, the structure may be such that the vibration-proof spring is abutted against a part of the valve element so as to apply the sliding resistance to the valve element.

In the above-described embodiments, the example has been shown where the vibration-proof spring is employed as a sliding member constituting the sliding mechanism and where a contact face, which comes in contact with the vibration-proof spring, is formed on the shaft or the body. Also, the example has been shown where the contact face has a level difference by forming a tapered portion. In a modification, a member other than the vibration-proof spring may be employed as the sliding member. For example, a seal ring such as an O-ring may be used as the sliding member, so that the shaft may abut against the contact face formed on the shaft or the body.

The present invention is not limited to the above-described embodiments and modifications only, and those components may be further modified to arrive at various other embodiments without departing from the scope of the invention. Also, various other embodiments may be further formed by combining, as appropriate, a plurality of structural components disclosed in the above-described embodiments and modifications. Also, one or some of all of the components exemplified in the above-described embodiments and modifications may be left unused or removed.

What is claimed is:

1. A control valve, provided in a refrigeration cycle, for controlling a flow of refrigerant, the control valve comprising:
    a body having a lead-in port through which the refrigerant is led in, a lead-out port through which the refrigerant is led out, and a valve hole formed in a refrigerant passage joining the lead-in port to the lead-out port;
    a valve element that opens and closes a valve section by moving toward and away from the valve hole;
    a drive section that generates a drive force used to open and close the valve section;
    a shaft, wherein one end connects to a movable member of the drive section and another end connects to the valve element, the shaft transmitting the drive force, generated by the drive section in a direction of axis line, to the valve element, wherein the shaft is so provided as to run through an insertion hole formed in the body; and
    a sliding member that directly or indirectly applies a sliding resistance to an actuation of the valve element,
    wherein the sliding member includes a bulging portion which is provided at an inner portion or an outer portion of the sliding member,
    wherein the sliding member generates the sliding resistance by a friction occurring between a contact face of the shaft or the body which comes in contact with the bulging portion and the bulging portion, and
    wherein a magnitude of the sliding resistance affected to the valve element is varied by a position of the valve element in the direction of axis line, when a position of contact point of the bulging portion and the contact face of the shaft or the body is varied.

2. The control valve according to claim 1, wherein the sliding member continuously varies, along a tapered portion of the shaft, the sliding resistance affected to the valve element according to the position of the valve element in the direction of axis line.

3. The control valve according to claim 1, wherein the sliding member varies, in stages, the sliding resistance affected to the valve element according to the position of the valve element in the direction of axis line.

4. The control valve according to claim 2, wherein the control valve functions as an expansion valve, in the refrigeration cycle, which throttles and expands the refrigerant, which has flowed in via an external heat exchanger, by allowing the refrigerant to pass through the valve section so as to supply the refrigerant to an evaporator, and
    wherein the valve element is provided upstream of the valve hole.

5. The control valve according to claim 3, wherein the control valve functions as an expansion valve, in the refrigeration cycle, which throttles and expands the refrigerant, which has flowed in via an external heat exchanger, by allowing the refrigerant to pass through the valve section so as to supply the refrigerant to an evaporator, and wherein the valve element is provided upstream of the valve hole.

6. The control valve according to claim 4, wherein, as the valve element approaches a valve closed position, the sliding member increases the sliding resistance affected to the valve element.

7. The control valve according to claim 5, wherein, as the valve element approaches a valve closed position, the sliding member increases the sliding resistance affected to the valve element.

8. The control valve according to claim 6, wherein, at least when the valve section is in a fully open state, the sliding member sets the sliding resistance, affected to the valve element, to zero.

9. The control valve according to claim 7, wherein, at least when the valve section is in a fully open state, the sliding member sets the sliding resistance, affected to the valve element, to zero.

10. The control valve according to claim 6, wherein the sliding member is a vibration-proof spring obtained by forming-processing a metallic plate.

11. A control valve according to claim 7, wherein the sliding member is a vibration-proof spring obtained by forming-processing a metallic plate.

12. The control valve according to claim 4, wherein the control valve functions as a thermostatic expansion valve, in the refrigeration cycle, which controls a valve opening degree of the valve section by sensing a pressure and a temperature of the refrigerant returned from the evaporator and which delivers the refrigerant to a compressor,
   wherein the body has a first lead-in port, functioning as the lead-in port, through which the refrigerant is led in from the external heat exchanger; a first lead-out port, functioning as the lead-out port, through which the refrigerant is led out to the evaporator; a first passage, functioning as the refrigerant passage, which joins the first lead-in port to the first lead-out port; the valve hole provided midway along the first passage; a second lead-in port through which the refrigerant returned from the evaporator is led in; a second lead-out port through which the refrigerant is led out to the compressor; and a second passage joining the second lead-in port to the second lead-out port,
   wherein a power element, which is activated by sensing a temperature and a pressure of the refrigerant flowing through the second passage, is provided, as the drive section, on an opposite side of the first passage relative to the second passage of the body, and
   wherein the shaft is so provided as to run through the insertion hole, which is formed in a partition wall between the first passage and the second passage,
   one end of the shaft is connected to the power element across the second passage, and another end thereof is connected to the valve element, and the shaft transmits the drive force of the power element to the valve element.

13. The control valve according to claim 5, wherein the control valve functions as a thermostatic expansion valve, in the refrigeration cycle, which controls a valve opening degree of the valve section by sensing a pressure and a temperature of the refrigerant returned from the evaporator and which delivers the refrigerant to a compressor,
   wherein the body has a first lead-in port, functioning as the lead-in port, through which the refrigerant is led in from the external heat exchanger; a first lead-out port, functioning as the lead-out port, through which the refrigerant is led out to the evaporator; a first passage, functioning as the refrigerant passage, which joins the first lead-in port to the first lead-out port; the valve hole provided midway along the first passage; a second lead-in port through which the refrigerant returned from the evaporator is led in; a second lead-out port through which the refrigerant is led out to the compressor; and a second passage joining the second lead-in port to the second lead-out port,
   wherein a power element, which is activated by sensing a temperature and a pressure of the refrigerant flowing through the second passage, is provided, as the drive section, on an opposite side of the first passage relative to the second passage of the body, and
   wherein the shaft is so provided as to run through the insertion hole, which is formed in a partition wall between the first passage and the second passage,
   one end of the shaft is connected to the power element across the second passage, and another end thereof is connected to the valve element, and the shaft transmits the drive force of the power element to the valve element.

14. The control valve according to claim 10, wherein the control valve functions as a thermostatic expansion valve, in the refrigeration cycle, which controls a valve opening degree of the valve section by sensing a pressure and a temperature of the refrigerant returned from the evaporator and which delivers the refrigerant to a compressor,
   wherein the body has a first lead-in port, functioning as the lead-in port, through which the refrigerant is led in from the external heat exchanger; a first lead-out port, functioning as the lead-out port, through which the refrigerant is led out to the evaporator; a first passage, functioning as the refrigerant passage, which joins the first lead-in port to the first lead-out port; the valve hole provided midway along the first passage; a second lead-in port through which the refrigerant returned from the evaporator is led in; a second lead-out port through which the refrigerant is led out to the compressor; and a second passage joining the second lead-in port to the second lead-out port,
   wherein a power element, which is activated by sensing a temperature and a pressure of the refrigerant flowing through the second passage, is provided, as the drive section, on an opposite side of the first passage relative to the second passage of the body, and
   wherein the shaft is so provided as to run through the insertion hole, which is formed in a partition wall between the first passage and the second passage,
   one end of the shaft is connected to the power element across the second passage, and another end thereof is connected to the valve element, and the shaft transmits the drive force of the power element to the valve element.

15. The control valve according to claim 11, wherein the control valve functions as a thermostatic expansion valve, in the refrigeration cycle, which controls a valve opening degree of the valve section by sensing a pressure and a temperature of the refrigerant returned from the evaporator and which delivers the refrigerant to a compressor,
   wherein the body has a first lead-in port, functioning as the lead-in port, through which the refrigerant is led in from the external heat exchanger; a first lead-out port, functioning as the lead-out port, through which the refrigerant is led out to the evaporator; a first passage, functioning as the refrigerant passage, which joins the first lead-in port to the first lead-out port; the valve hole provided midway along the first passage; a second lead-in port through which the refrigerant returned from the evaporator is led in; a second lead-out port through which the refrigerant is led out to the compressor; and a second passage joining the second lead-in port to the second lead-out port,
wherein a power element, which is activated by sensing a temperature and a pressure of the refrigerant flowing through the second passage, is provided, as the drive section, on an opposite side of the first passage relative to the second passage of the body, and
wherein the shaft is so provided as to run through the insertion hole, which is formed in a partition wall between the first passage and the second passage,
one end of the shaft is connected to the power element across the second passage, and another end thereof is connected to the valve element, and the shaft transmits the drive force of the power element to the valve element.

16. The control valve according to claim 9, wherein the control valve functions as a thermostatic expansion valve, in the refrigeration cycle, which controls a valve opening degree of the valve section by sensing a pressure and a temperature of the refrigerant returned from the evaporator and which delivers the refrigerant to a compressor,
wherein the sliding member is a vibration-proof spring obtained by forming-processing a metallic plate, wherein the body has a first lead-in port, functioning as the lead-in port, through which the refrigerant is led in from the external heat exchanger; a first lead-out port, functioning as the lead-out port, through which the refrigerant is led out to the evaporator; a first passage, functioning as the refrigerant passage, which joins the first lead-in port to the first lead-out port; the valve hole provided midway along the first passage; a second lead-in port through which the refrigerant returned from the evaporator is led in; a second lead-out port through which the refrigerant is led out to the compressor; and a second passage joining the second lead-in port to the second lead-out port,
wherein a power element, which is activated by sensing a temperature and a pressure of the refrigerant flowing through the second passage, is provided, as the drive section, on an opposite side of the first passage relative to the second passage of the body, and
wherein the shaft is so provided as to run through the insertion hole, which is formed in a partition wall between the first passage and the second passage,
one end of the shaft is connected to the power element across the second passage, and another end thereof is connected to the valve element, and the shaft transmits the drive force of the power element to the valve element.

* * * * *